US006272626B1

(12) United States Patent
Cobbett

(10) Patent No.: US 6,272,626 B1
(45) Date of Patent: *Aug. 7, 2001

(54) SYSTEM FOR SETTING A FLAG INDICATING A BOOT FAILURE OF LOADING A PROCEDURE AND ABORTING ADDITIONAL LOADING ATTEMPT THEREOF WHEN THE FLAG IS DETECTED

(75) Inventor: Michael Cobbett, Eastleigh (GB)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/112,574

(22) Filed: Jul. 9, 1998

(30) Foreign Application Priority Data

Dec. 20, 1997 (GB) .................................................. 9726835

(51) Int. Cl.[7] .................................................. G06F 9/445
(52) U.S. Cl. .................................. 713/2; 713/100; 714/7; 714/36
(58) Field of Search .................................. 713/1, 2, 100; 714/7, 55, 36, 717; 710/128; 395/575; 709/220, 221, 222

(56) References Cited

U.S. PATENT DOCUMENTS

| 4,070,704 | 1/1978 | Calle et al. .......................... 364/200 |
| 5,432,927 | * 7/1995 | Grote et al. .......................... 395/575 |
| 5,491,788 | * 2/1996 | Cepulis et al. .......................... 714/15 |
| 5,564,054 | * 10/1996 | Bramnick et al. .......................... 717/1 |
| 5,615,330 | * 3/1997 | Taylor .......................... 714/7 |
| 5,708,776 | * 1/1998 | Kikinis .......................... 714/55 |
| 5,724,528 | * 3/1998 | Kulik et al. .......................... 710/128 |
| 5,727,213 | * 3/1998 | Vander Kamp et al. .......................... 709/301 |
| 5,794,032 | * 8/1998 | Leyda .......................... 713/2 |
| 5,927,050 | * 4/2000 | Houck et al. .......................... 53/428 |
| 5,935,242 | * 8/1999 | Madany et al. .......................... 713/1 |
| 5,951,686 | * 9/1999 | McLaughlin et al. .......................... 713/2 |
| 5,974,546 | * 10/1999 | Anderson .......................... 713/2 |
| 6,014,744 | * 1/2001 | Mckaughan et al. .......................... 713/2 |
| 6,049,871 | * 4/2000 | Silen et al. .......................... 713/2 |
| 6,073,220 | * 6/2000 | Gunderson .......................... 711/162 |

FOREIGN PATENT DOCUMENTS 0273260  12/1987  (EP) .................................. G06F/9/24

* cited by examiner

Primary Examiner—Thomas Lee
Assistant Examiner—Rijue Mai
(74) Attorney, Agent, or Firm—Douglas W. Cameron; Anne Vachon Dougherty

(57) ABSTRACT

A system and method for boot failure recovery in a digital computer as a result of an attempt to load a procedure in which a flag is associated with the procedure following a loading attempt which results in failure. The flag is read on a further attempt to load the same procedure to initiate an orderly exit thereby avoiding the potential for entry into an endless loop.

10 Claims, 2 Drawing Sheets

SYSTEM FOR SETTING A FLAG INDICATING A BOOT FAILURE OF LOADING A PROCEDURE AND ABORTING ADDITIONAL LOADING ATTEMPT THEREOF WHEN THE FLAG IS DETECTED

FIELD OF THE INVENTION

This invention relates generally to digital computers and particularly to a system and method for recovering from failure of the startup process, commonly referred to as booting, in such computers.

BACKGROUND OF THE INVENTION

As computers have become more sophisticated and particularly as they have been adapted to handle data from a wider range of input/output devices, the booting process has become increasingly complex. While mechanisms have been developed for minimising the effect of boot failure, circumstances can still arise which result in the system crashing or hanging, not least because the process necessarily involves key system operating procedures.

Such circumstances can arise, for example, when a new input/output device has been added to the system, requiring a new device driver to be loaded. If the device driver encounters hardware or operating conditions not anticipated by the device driver designer the booting process can fail, leading to a system crash and/or to a hang condition in which the computer performs a continuous loop.

One approach to the problem is described in U.S. Pat. No. 5,564,054. Using this approach a set of log in files, not accessible to a user and therefore not susceptible to unexpected modifications, is maintained to define a minimal system configuration. After a predetermined number of unsuccessful attempts to load a set of log in files supplied by a user the system is arranged to switch to a boot mode in which the log in files defining the minimum configuration are loaded.

Such an approach leaves the user with a basic minimum configuration which permits the cause of the failure to be investigated. However a number of functions not responsible for the failure are excluded from the minimum configuration. While this may be no more than inconvenient in an individual installation, the loss of such functions can have serious consequences in a system where the computer interacts with other computers, as in a network.

In a typical network individual computers operate under the control of an operating system such as AIX (Trade Mark of IBM Corporation) which, in order to ensure that all functions are available in associated computers when called for, employ booting systems which scan the adapter cards providing functions in the associated computer and load drivers appropriate to support the adapter cards. If all goes well the loading proceeds without incident. However if unforeseen circumstances are encountered, or if for some other reason the booting process fails, the result can be a crashed system, causing loss of all services from the affected machine. If the system is configured to re-boot automatically in the event of a crash, a re-boot could occur, which in turn can cause the same load problem resulting in a continuous loop of starting the boot-up, loading the (failing) driver, crashing, re-starting the boot-up, and so on. This endless looping condition also renders the computer unavailable to the rest of the network.

It is accordingly an object of the present invention to provide a system and method for boot failure recovery in a digital computer which addresses this problem.

SUMMARY OF THE INVENTION

According to the invention there is provided a method for recovering from a boot failure in a digital computer following an attempt to load a procedure, comprising the steps of associating with said procedure a flag indicating that a loading attempt has resulted in boot failure, testing said procedure for an associated flag in any subsequent attempt to load such procedure, and aborting such subsequent attempt if such flag is detected.

According to a second aspect of the invention there is provided a system for recovering from boot failure in a computer as a result of an attempt to load a procedure, including storage means for storing procedures to be loaded, means for selecting a procedure for loading from said storage means, flag means responsive to the occurrence of boot failure on loading of a selected procedure to associate a flag with such selected procedure, and test means responsive to such flag to abort a subsequent attempt to load the associated procedure.

Typically the procedures will be device drivers each configurable by a configuration method selected under the control of an entry in a database using a key developed from identifier information obtained from adapter cards resident in the computer. The boot failure flag may then be stored with the corresponding entry in the database when a driver is selected for configuration, and removed only after successful configuration, leaving the failure flag associated with the driver in the event of boot failure.

The above functionality may be incorporated into the configuration methods, or the operating system itself may include routines which provide for these functions.

In order that the invention may be well understood a preferred embodiment thereof will now be described with reference to the accompanying drawings, in which.

DETAILED DESCRIPTION OF THE PREFERRED EMBODIMENT

Figure 1:
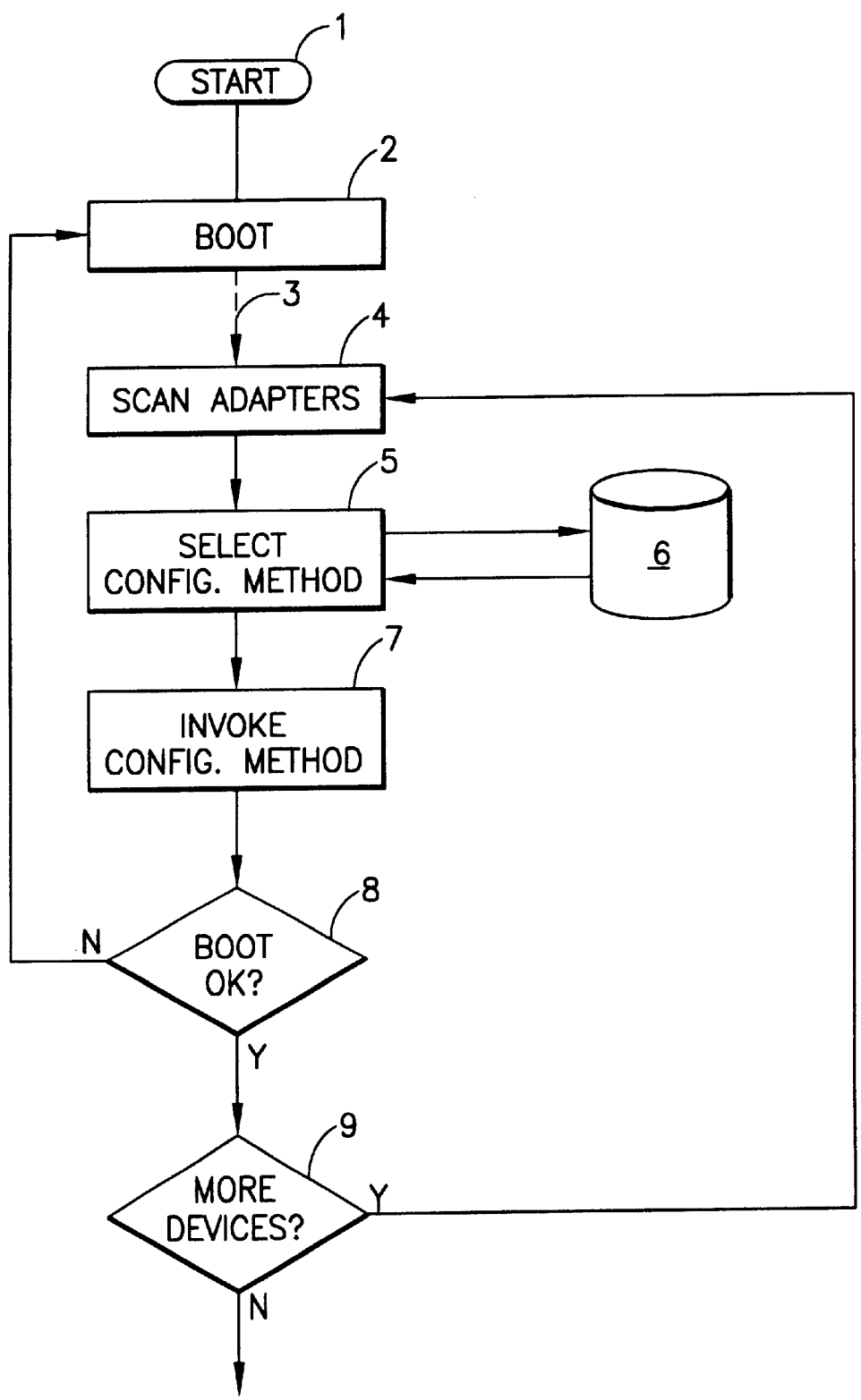
FIG. 1 is a flow diagram showing the relevant portions of a conventional booting system to illustrate how boot failure can result in a looping condition.

Referring to FIG. 1. there is shown in flow chart form a booting system typical of that which would be implemented by a computer operating under the control of the AIX operating system. This operating system accommodates adapter cards which include registers, called POS registers, holding data identifying the associated card and in particular providing data necessary to call the appropriate software for loading the correct driver for the adapter device.

The booting process is started at 1 typically by switching on the machine providing power to the various devices involved in performing the boot process at 2. Following power up various routines are followed at 3 such as the running of the BIOS (Basic Input Output System) and the loading of the operating system which are not specifically concerned with the loading of device drivers. Then, at 4 the operating system initiates a scan of the adapter cards to obtain the POS data for the next card for which a driver is to be loaded. This data is recovered from an address register at 5 and used to index a database 6 to select the driver to be configured for the associated adapter card. The configuration process is carried out at 7 using the selected configuration data and is monitored at 8 for success or failure. Assuming the configuration is successful a test is made at 9 to determine whether any more devices require the installation of drivers. If so the process loops back to step 4 and is repeated for a different device. If not the operating system continues with the boot process leading ultimately to the availability of the computer for use.

If failure is detected at 8 it may be as a result of various circumstances some of which may have been anticipated and can therefore lead to an orderly resumption of the scanning process by pre-arranged recovery techniques. However in practice circumstances do arise which are not anticipated, leading to re-booting at stage 2 starting the whole process again. The same device will be scanned at 4 and the configuration of the same driver will be re-attempted at 7 leading to a second failure and so to the execution of a continuous loop.

Figure 2:
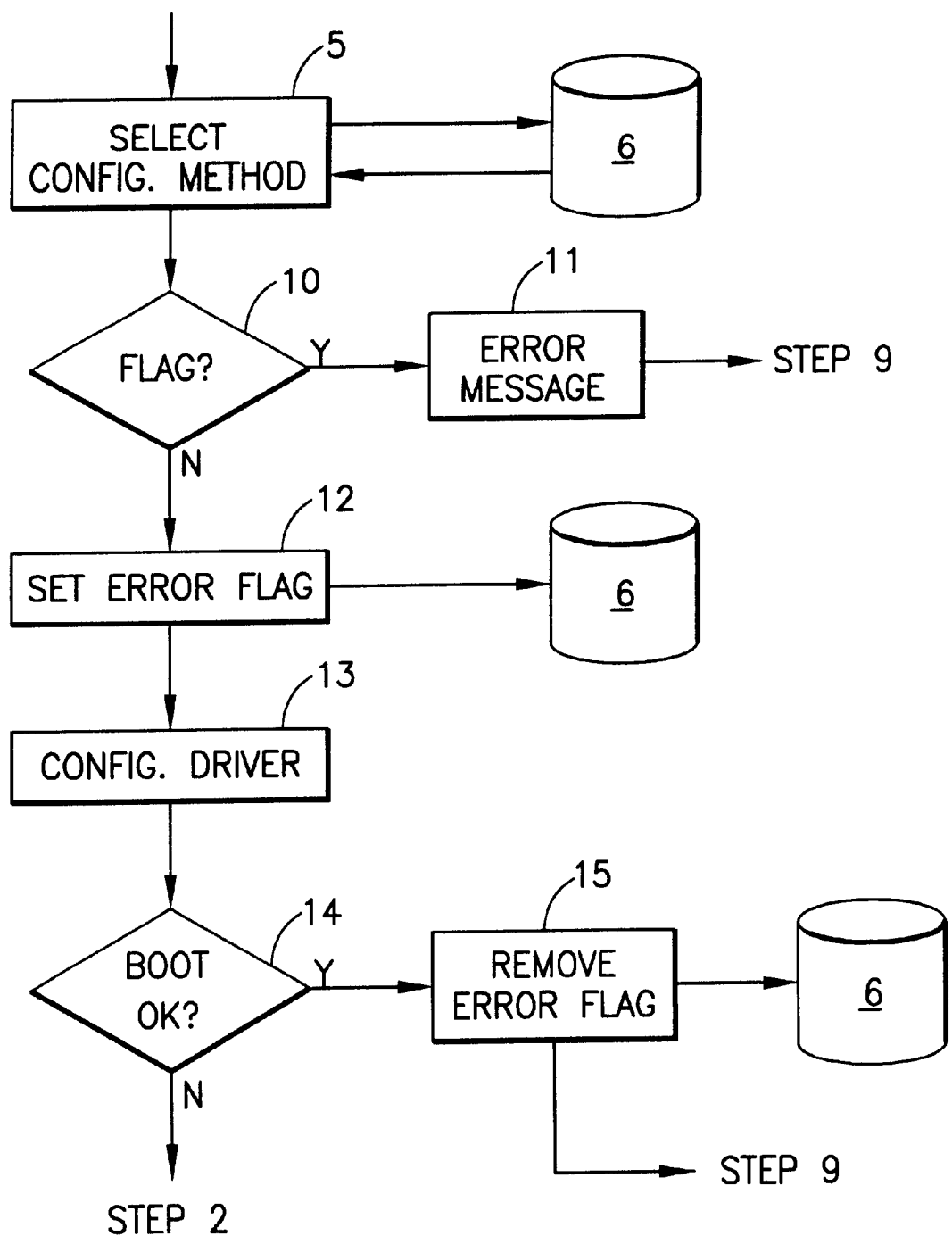
FIG. 2 shows an improved system embodying the invention.

An improved system embodying the invention is shown in FIG. 2. It includes routines which operate, if a boot failure is detected following an attempt to configure a particular driver, to associate a flag with that driver. On a subsequent attempt to access the same driver following identification at step 5 of the POS register data a further routine operates to determine whether a flag is associated with that driver and if so returns the process to step 4 to select another adapter card.

Referring to FIG. 2. the operating system performs steps 1 to 4 as in FIG. 1 and the POS register is read as before to select the configuration method at 5 using the POS register data as a key. Also returned at this point with the identity of the selected configuration method is a flag if boot failure was detected in the previous boot cycle.

A test is made at 10 to determine whether a flag was returned at 5. If so an error warning is generated at 11, no configuration is attempted, and the system returns to scan for the next adapter at step 9.

If no flag is detected the operating system proceeds at 12 to set a failure flag into the database in association with the selected configuration method and the method is invoked at 13. If, at 14, it is determined that the machine has crashed, the boot sequence is re-started with the failure flag left in the database, the system being returned to step 2 and a reboot performed. Although the failing driver is again selected, the failure flag is now detected at 10, and an orderly resumption of the scan for another adapter is initiated. If, on the other hand, no crash occurs, the database is again accessed, at 15, to remove the failure flag which was entered at 12 and the operating system returns to scan for the next adapter at step 9.

Thus, if a device driver crashes during configuration, no code can be executed after that point until the re-boot is re-started, avoiding any possibility that a corrupted driver can interfere with the database. In particular any flag set into the database is entered before a driver is configured, and the database is accessed to remove it only when the driver has been safely configured.

The functions performed at 10, 11, 12, and then at 14 and 15 in FIG. 2 are conveniently performed by the operating system itself. Alternatively, for use with a prior art operating system, each configuration method may perform steps 10, 11 and 12 (as appropriate), when initially invoked, and steps 14 and 15 (as appropriate) at its conclusion, before returning control back to the operating system. It is also possible to imagine various hybrids, for example where the operating system performs steps 10 and 11, but the configuration method performs steps 12, 13, 14, and 15.

While the invention has been described in the context of an AIX operating system it will be appreciated that it could be applied with appropriate modification to other environments providing for dynamic loading of drivers, such as OS/2 (Trademark of IBM Corporation) and Windows (Trademark of Microsoft Corporation).

What is claimed is:

1. A method for recovering from a boot failure in a digital computer following an attempt to load a procedure, said procedure comprising a device driver configurable under the control of an entry in a database using identifier information obtained from adapter cards resident in said computer comprising the steps of:

in response to load failure of a specific procedure, associating with said procedure a flag indicating that a loading attempt has resulted in boot failure by storing said flag in the entry in said database relating to the driver causing the failure;

testing said procedure for an associated flag in a subsequent attempt to load such procedure; and aborting such subsequent attempt if such flag is detected.

2. A method as claimed in claim 1 in which said step of associating includes setting a failure flag in association with a selected procedure in said database prior to an attempt to configure such selected procedure and removing such failure flag only after successful configuration of said procedure.

3. A method as claimed in claim 1 in which said steps of associating, testing and aborting are performed by routines incorporated within the operating system of said computer.

4. A method as claimed in claim 1 in which said steps of associating, testing and aborting are performed by routines incorporated within the operating system of said computer.

5. A method as claimed in claim 2 in which said steps of associating, testing and aborting are performed by routines incorporated within the operating system of said computer.

6. A system for recovering from boot failure in a computer as a result of an attempt to load a procedure, said procedure comprising a device driver configurable under the control of an entry in a database using identifier information obtained from adapter cards resident in said computer, comprising:

storage means for storing procedures to be loaded;

means for selecting a procedure for loading from said storage means;

flag means responsive to the occurrence of boot failure on loading of selected procedure to associate a flag with such selected procedure, wherein said flag is associated with the entry in said database relating to the driver causing the failure; and test means responsive to such flag to abort a subsequent attempt to load the associated procedure.

7. A system as claimed in claim 6 in which said failure flag is stored in said database on selection of a driver for configuration and removed only after successful configuration of said procedure.

8. A system as claimed in claim 6 in which said selecting, flag and test means are incorporated within the operating system of said computer.

9. A system as claimed in claim 6 in which said selecting, flag and test means are incorporated within the operating system of said computer.

10. A system as claimed in claim 7 in which said selecting, flag and test means are incorporated within the operating system of said computer.

\* \* \* \* \*